Dec. 21, 1948.  S. H. McALLISTER  2,456,975
PRODUCTION OF MOTOR FUEL COMPONENTS
Filed Nov. 18, 1944
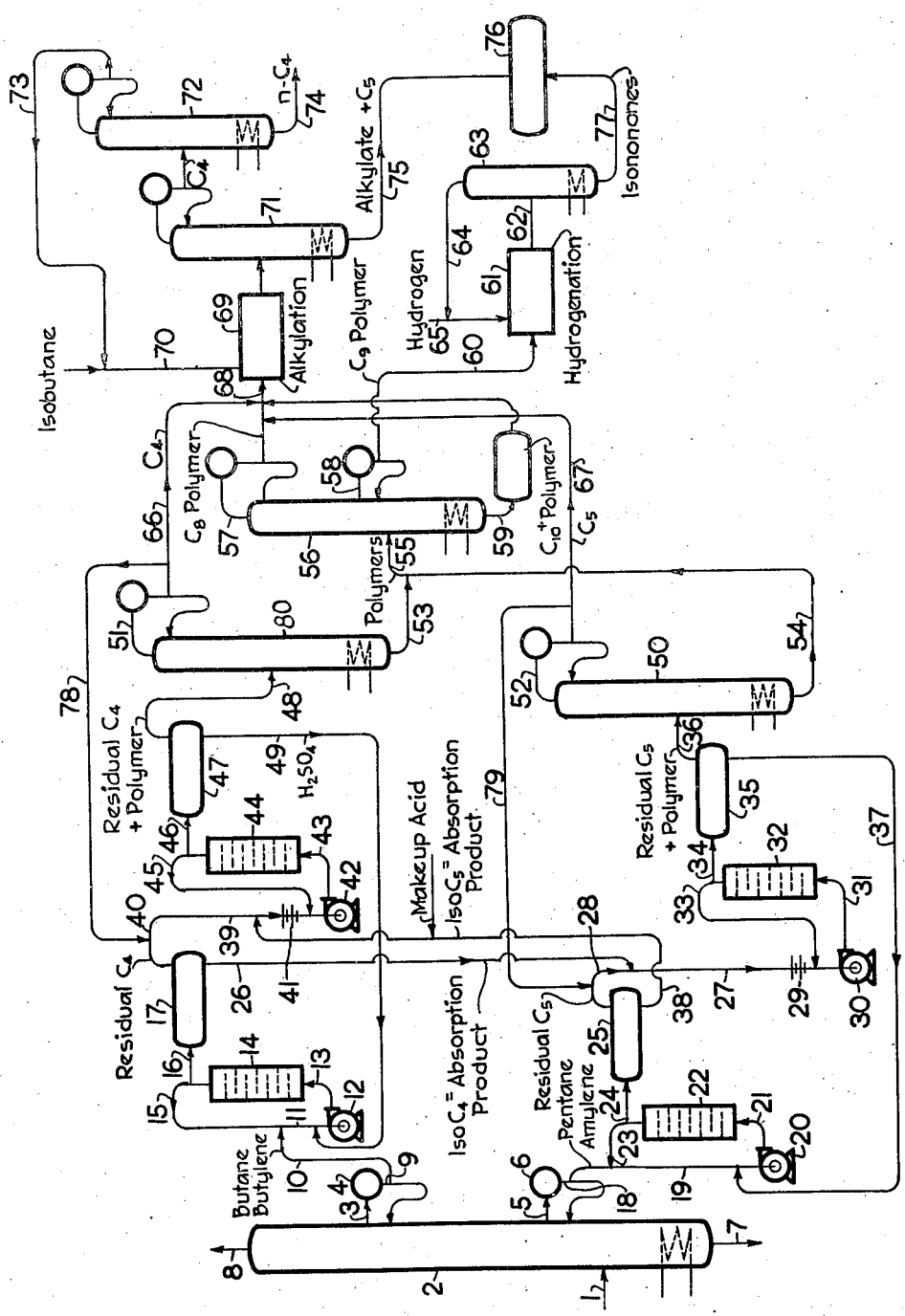
Inventor: Sumner H. McAllister
By his Attorney: Millard L Caldwell Patented Dec. 21, 1948

2,456,975

UNITED STATES PATENT OFFICE 2,456,975

PRODUCTION OF MOTOR FUEL COMPONENTS

Sumner H. McAllister, Lafayette, Calif., assignor to Shell Development Company, San Francisco, Calif., a corporation of Delaware Application November 18, 1944, Serial No. 564,114

2 Claims. (Cl. 260—683.15)

This invention relates to the synthesis of hydrocarbons suitable for use in motor fuels from lower boiling olefin-containing hydrocarbon mixtures. It deals particularly with an improved process involving a succession of closely co-operating steps whereby high yields of higher quality products especially adapted for use in aviation gasoline may be obtained in an efficient and economical manner.

The invention is particularly advantageous in the treatment of hydrocarbon mixtures containing olefins having four and five carbon atoms per molecule such as occur in the products of thermal or catalytic cracking of petroleum or other suitable carbonaceous materials. However, the process is also applicable to other mixtures comprising tertiary olefins of different molecular weights and the corresponding normal olefins whether produced by cracking or in any other manner, such, for example, as by dehydrogenation of the corresponding paraffins or by dehydration of alcohols, etc.

Various methods of using such starting materials to prepare motor fuel components have been proposed and procedures involving polymerization or alkylation with such olefins have been carried out on a large scale. The commercially successful methods of polymerization heretofore used have depended upon the polymerization of individual olefins, particularly the conversion of isobutylene to di-isobutylene, a type of reaction which will be referred to hereinafter as copolymerization, or upon the interpolymerization, i. e., polymerization in which two different olefins combine, of tertiary olefins with the corresponding secondary olefins. Olefin mixtures have also been polymerized non-selectively by contact with catalysts such as phosphoric acid on a support to produce polymers of a highly heterogeneous composition which on hydrogenation yield a polymer gasoline much inferior in quality to those obtainable by the other described procedures.

It has now been found that the products obtained by interpolymerizing olefins of different molecular weights and hydrogenating the resulting dimers have hitherto unsuspected advantages as motor fuel components. Thus, for example, by interpolymerizing tertiary amylenes with normal butylenes or isobutylene with normal amylenes, isononylenes may be obtained which on hydrogenation give products having rich mixture performance index numbers of 160 compared with an index number of only 140 for the iso-octane obtained by co-polymerization of isobutylene. This difference corresponds to an increased power output of about 14% for the isononane products. An important object of the present invention is to provide a process for producing desirable interpolymers of this type in maximum yield, particularly the maximum production of isononanes from $C_4$ and $C_5$ olefinic fractions. Another object is to reduce the cost of production of alkylation and polymerization products useful as gasoline components. Still other objects and advantages of the new process will be apparent from the following more detailed description of the invention.

According to the invention, high yields of which quality gasoline components are produced from cracked or other similar unsaturated hydrocarbons by first segregating at least two fractions of different average molecular weights containing different tertiary and normal olefins, particularly a butane-butylene fraction which may also contain lower boiling olefins and a pentane-amylene fraction which may contain higher boiling hydrocarbons. The separated fractions are then separately treated to substantially remove tertiary olefins from the corresponding normal olefins. This separation may advantageously be effected by selective absorption of the tertiary olefins in a suitable solvent, preferably a solvent such as aqueous sulfuric or phosphoric acid or the like which is also an effective polymerization catalyst. But, however the separation is carried out, polymerization is preferably avoided at this stage. Each of the separated tertiary olefins, preferably in solution in the polymerizing solvent used to effect their separation, is contacted with the residual, mainly normal, olefin-containing hydrocarbon fraction from the other tertiary olefin separation treatment and the mixtures are separately subjected to interpolymerization conditions. Thus isobutylene is selectively absorbed from a butane-butylene fraction in which it is present with normal butylenes and the absorption product is reacted with the residual amylenes from a pentane-amylene fraction which has been treated with sulfuric acid to selectively absorb tertiary amylenes and leave the normal amylenes substantially unaffected and the tertiary amylene absorption product is interpolymerized with the residual butylenes remaining after the isobutylene absorption treatment. These interpolymerizations are carried out in both cases so as to favor the formation of isononylenes. These are hydrogenated while the remaining unreacted olefins, with or without any other olefin polymers formed, may be used for alkylation of isobutane and the alkylate blended with the isononanes produced according to the invention to give substantially higher yield of aviation blending agents of high performance rating.

The interpolymerization method of the invention has many advantages, particularly with respect to elimination of undesired co-polymerization of the starting olefins. Thus, for example, isobutylene may be more efficiently interpolymerized with normal amylenes than with tertiary amylenes since the reactivity of the latter is of the same order as that of isobutylene while normal amylenes polymerize much more slowly than isobutylene so that a large excess may be maintained in the reacting mixture and the reaction thus made to go substantially to interpolymerization between the different olefins. The same considerations apply to interpolymerizations between the normal olefins and in addition the products obtained by reacting normal amylenes with normal butylenes are of a much inferior quality.

As previously indicated, while other methods of separating the tertiary olefins from the $C_4$ and $C_5$ fractions used as starting materials in the process may be employed, it is preferred to carry out these separations by absorption of the tertiary olefins in a suitable selective solvent. Sulfuric acid of about 60% to about 85% concentration is particularly suitable since such acid is also an effective polymerization catalyst. When employing such a solvent a temperature between about 0° C. and about 40° C. is preferably maintained in the absorber in order to avoid olefin polymerization. The absorption is preferably carried out with the hydrocarbons in the liquid phase but it is feasible to selectively absorb the tertiary olefins from the starting fractions in the gaseous state. In operations in the liquid phase an acid to hydrocarbon volume ratio of about 0.5:1 to about 1.5:1 or higher and a time of contact of about 5 minutes to 30 minutes is usually sufficient for the selective removal of about 90% to 98% of the tertiary olefin-content of butane-butylene and pentane-amylene fractions of petroleum cracking products containing from about 12% to 35% of branched chain olefins. Since there is a somewhat greater tendency for tertiary amylenes to polymerize than isobutylene, it is preferred to carry out the absorption of the former under somewhat milder conditions within the foregoing ranges than those used for the isobutylene absorption step in order that premature polymer formation may be avoided as completely as possible.

For maximum production of nonylenes according to the invention the proportions of the reactants and the reaction conditions should be adjusted in accordance with the different reactivities of the olefins involved so as to favor interpolymerization of the tertiary olefins with the different olefins with which they are reacted. Thus tertiary amylenes are appreciably more reactive and tend to polymerize faster than isobutylene and this fact must be taken into consideration in the polymerization steps of the process. The difference in reactivity between the normal butylenes and normal amylenes is not so great although the butylenes appear to polymerize somewhat more readily although not as fast as isobutylene. These differences in polymerization rates may be compensated for by adjustments in the activity of the polymerization catalysts (with aqueous acid polymerization catalysts, for example, this may be regulated by varying the acid concentration) or by control of the proportions of the reactants or by the use of different reaction temperatures and/or times or by suitable combinations of all of these factors. In both interpolymerizations, however, it is desirable to maintain a substantial molecular excess of the less reactive normal olefin over the tertiary olefin present therewith. Thus, in reacting an isobutylene absorption product in sulfuric acid with residual amylenes from a tertiary amylene extraction treatment, it is preferred to use at least three and preferably five to ten mols of amylene per mol of absorbed isobutylene. In this step of the process sulfuric acid of about 65% to 75% concentration is preferred and a temperature of about 70° C. to about 110° C. is suitable with an average reaction time of about 20 to 60 minutes. For the other polymerization step of the process, namely the reaction of absorbed tertiary amylenes, i. e. trimethyl ethylene and/or unsymmetrical methyl ethyl ethylene, with residual unabsorbed normal butylenes, somewhat more drastic polymerization conditions are advantageous but lower ratios of normal olefin to tertiary olefin may be used, although a molar ratio of at least two to one is preferred in this case also. Suitable conditions are, for example, the use of four to eight mols of secondary butylenes per mol of absorbed tertiary amylene in sulfuric acid of about 60% to 80% concentration at about 60° C. to about 120° C. and a polymerization time of about 5 to 60 minutes. Within these preferred ranges substantially equivalent results may be obtained by different combinations of conditions, for example, by the use of lower acid concentrations at higher temperatures or vice versa. In all cases, however, it is desirable to choose reaction conditions which give the maximum yield of desired isononylenes since it has been found that these, on hydrogenation, yield isononanes which have desirable power output. Thus, the isononane fraction of the products of the invention has a rich mixture performance index number of 160 compared with an index number of 140 for the isooctanes produced by hydrogenation of di-isobutylene and tested under the same conditions. This is quite unexpected since the octane number of the isononanes is not outstanding being, in fact, lower than that of iso-octane. As a result the process of the invention makes it feasible to markedly increase the power output which may be obtained in an internal combustion engine from a given amount of $C_4$ and $C_5$ hydrocarbons. Also since the isononane fraction of the product has a higher rich mixture index number than the $C_8$ fraction which is usually obtained as a by-product in the process, it is preferred to segregate the latter prior to the hydrogenation step of the process of the invention and to feed these octylenes to an alkylation unit, most preferably along with the residual butylenes and amylenes from the polymerization step of the process. In the alkylation unit these olefins are reacted with an isoparaffin such as isobutane in the presence of a suitable catalyst, for example, sulfuric acid, hydrogen fluoride or aluminum chloride, and the resulting high octane paraffins may be blended with the isononanes from the hydrogenation step to obtain a substantially complete conversion of the starting olefins to gasoline boiling products which give excellent performance, particularly in aviation service.

The character and steps of the process of the invention will be amplified by describing a typical operation in connection with the attached drawing which shows, diagrammatically, by the use of conventional figures in general side elevation, one suitable arrangement of equipment in which the objects of the invention may be accomplished. The units and connections shown in the drawing are not to any exact or relative scale and many pieces of auxiliary equipment including temperature regulating means, measuring devices, valves, etc., have been omitted since their location will be obvious to those skilled in the art.

In the drawing, line 1 represents a feed line for supplying olefin-containing hydrocarbons comprising tertiary and normal butanes, butylenes, pentanes and amylenes and higher and lower boiling components, for example, products of thermal and/or catalytic cracking of petroleum oils or the like, from a source not shown, to a fractionating column 2 in which a fraction of hydrocarbons of four carbon atoms per molecule is taken off as a side stream by line 3 and conducted to a condenser and accumulator 4. Another side stream composed essentially of $C_5$ hydrocarbons is withdrawn by line 5 to condenser and accumulator 6 while higher boiling products are removed as bottoms by line 7 and components of less than four carbon atoms per molecule are taken off overhead by line 8. The separated butane-butylene fraction is fed by lines 9 and 10 into a circulating stream of sulfuric acid and $C_4$ hydrocarbons in line 11. The resulting mixture is passed by pump 12 through line 13 to reactor 14 which may be a tank containing baffles or inert packing or other suitable device for promoting intimate contact of the acid with the hydrocarbon under conditions controlled, by means not shown, so as to promote selective absorption of isobutylene in the acid without substantial polymerization or absorption of normal butylenes. To this end a part of the emulsion is advantageously recirculated by line 15 for mixing with the feed in line 11 while the remainder, equivalent in amount to the feed introduced by line 10 is removed by line 16 to a separator 17 in which the mixture is allowed to stratify so as to separate the residual unabsorbed normal butylenes and normal and isobutanes from the absorption product of isobutylene in sulfuric acid. At the same time the separated pentane-amylene fraction from condenser and accumulator 6 is conducted by line 18 to a circulating stream of sulfuric acid and hydrocarbon flowing in the circuit formed by pump 20, line 21, reactor 22 and return lines 23 and 19. The conditions in this system are adjusted so that tertiary amylenes are selectively absorbed and the absorption product and unreacted hydrocarbons are removed by line 24 and separated in decantation vessel 25. The tertiary olefin absorption steps of the process shown in the drawing as carried out in single units may each be effected in a series of stages operated counter-currently in order to obtain more efficient selective absorption.

The absorption product of isobutylene in sulfuric acid, preferably containing a molar excess of acid to olefin, advantageously 2 to 3 mols or more of acid per mol of absorbed isobutylene, from separator 17 is fed by line 26 to line 27 where it is admixed with a molecular excess of amylenes in the residual hydrocarbons from separator 25 which are introduced by line 28. The isobutylene absorption product and amylene-containing hydrocarbon are advantageously thoroughly admixed under non-polymerizing conditions, as by orifice plates 29 or other suitable means, before being fed into a circulating stream of emulsified acid and hydrocarbon flowing under polymerization conditions through pump 30, line 31, time tank 32 and return line 33. By proper adjustment of the operating conditions, as previously indicated, the absorbed isobutylene is caused to react with the amylenes in the liquid phase to produce branched chain nonylenes and to minimize formation of di-isobutylene and co-polymers of the amylenes present. To insure the desired high ratio of normal amylenes to absorbed isobutylene, unreacted amylenes recovered in a later stage of the process may be recycled by line 79 to mix with the amylenes in line 28. The reacted emulsion is withdrawn by line 34 to separator 35 from which residual $C_5$ hydrocarbons and polymer are removed by line 36 while the separated acid is taken off by line 37 and returned to line 19 for reuse in the absorption of tertiary amylenes. The tertiary amylene absorption product, also preferably containing a molecular excess of acid based on the olefin absorbed, is withdrawn from separator 25 by line 38 and fed to line 39 where it is contacted with residual butane-butylene in the liquid phase from separator 17 introduced by line 40. The absorption product and hydrocarbon are thoroughly emulsified under non-polymerizing conditions by mixing means 41 and are then fed into a circulating stream of reaction mixture under polymerization conditions flowing through pump 42, line 43, time tank 44 and return line 45. The reaction conditions in this unit may be somewhat less drastic than those used in reactor 32 and are such as favor the production of isononylenes of desirable chain structure from the absorbed tertiary amylenes and unabsorbed normal butylenes present. Production of tertiary amylene copolymers and of octylenes from the normal butylenes is minimized by carrying out the reaction with a substantial excess of butylenes based on the amylenes present which butylenes may be supplied in part as recycled butylenes introduced into line 40 by line 78 and by maintaining a temperature and acid concentration at which copolymerization of normal butylenes is not favored. The reacted mixture is withdrawn from the reaction system by line 46 and fed to separator 47 from which residual butane-butylenes and admixed polymer is removed by line 48 while the separated acid is returned by line 80 to the isobutylene absorption system.

The polymerization products from the two reaction stages of the process may be separately distilled to separate unreacted hydrocarbons therefrom by feeding the products from line 48 to still 49 and the pentane-amylene containing polymer from line 36 to still 50. The unreacted butane-butylenes and pentane-amylenes are taken off overhead by lines 51 and 52 respectively while the polymers recovered as bottom products by lines 53 and 54 are combined and fed by line 55 to fractionating column 56 for separation of the desired isononylenes from the co-polymers formed therewith. The $C_8$ fraction produced by butylene co-polymerization is taken off overhead by line 57 while the desired isononylenes are removed as a side stream by line 58 and the amylene co-polymers and higher boiling products are recovered as bottoms by line 59. The isononylenes are conducted by line 60 to a hydrogenation unit 61 in which they are reacted with hydrogen in the presence of any suitable type of hydrogenation catalyst such, for example, as reduced nickel or nickel oxide with or without supports such as siliceous carriers, etc. Less active catalysts such as oxides or sulfides of chromium, molybdenum and tungsten, particularly mixtures of tungsten and nickel sulfides, may also be used. The temperature, pressure, time of contact and hydrogen to isononylene ratios vary widely depending upon the activity of the catalyst used but may be readily adjusted in any given case so as to insure the production of a substantially saturated isononane product of high super-charged engine performance. In some cases it may be desirable to fractionate the bottom product of column 49 to separate a $C_{10}$ fraction which may also be hydrogenated along with or separately from the isononylenes since the isodecylenes produced by co-polymerization of tertiary amylenes yield isodecanes having good performance characteristics. The reacted hydrogenation mixture is withdrawn by line 62 and the excess hydrogen separated in column 63 and returned to the hydrogenation unit by line 64 together with additional hydrogen supplied by line 65.

The unreacted $C_4$ and $C_5$ hydrocarbons recovered from the polymers will contain substantial amounts of olefins which are recycled in part to the polymerization stages by lines 78 and 79 respectively while the remainder of these streams are preferably fed by lines 66 and 67 to line 68 containing the polymers of eight or less carbon atoms per molecule which are fed to an alkylation unit 69. Alkylation unit 69 may be of any suitable type and may comprise one or more reactors connected in series or parallel in which the $C_4$, $C_5$ and $C_8$ olefins may be reacted with isobutane or other suitable isoparaffin introduced by line 70. The alkylations with these different olefins may be carried out with each olefin separately or with mixtures of two or more olefins in the same reactor and, if desired, different catalysts may be used in each case or all the alkylations may be effected with the same catalyst. The alkylation products are fed to a column 71 in which they are debutanized and the $C_4$ hydrocarbons removed are fractionated in column 72 to separate isobutane for recycling to the reaction via line 73 from normal butane which is withdrawn by line 74. The alkylation products and unreacted pentanes may be recovered as bottoms by line 75 and after fractionation, by means not shown, to remove any undesired high boiling components may be blended in unit 76 with the isononanes recovered as bottoms from column 63 by line 77.

The following example is given to indicate the improved results which are normally obtainable in the operation of the new process and to illustrate its advantages.

A butane-butylene and a pentane-amylene fraction were separated from Dubbs cracking products and had the following composition on a mol percent basis:

*Butane-butylene fraction*

| | |
|---|---|
| Isobutylene | 18 |
| Normal butylenes | 30 |
| Isobutane | 10 |
| Normal butane | 42 |

*Pentane-amylene fraction*

| | |
|---|---|
| Tertiary amylenes | 25.5 |
| Normal amylenes | 24.5 |
| Isopentane | 18 |
| Normal pentane | 32 |

Treatment of the butane-butylene fraction with two mols of sulfuric acid, of 70% concentration, per mol of isobutylene at 20° C. for an average time of contact of 20 minutes, extracts 93% of the isobutylene along with 6% of normal butylenes, while similar extraction of the pentane-amylene fraction removes 85% of the tertiary amylene together with 5% of the normal amylenes. The residual hydrocarbon layers from the absorption operations had the following composition:

*Residual butane-butylene*

| | |
|---|---|
| Isobutylene | 1.6 |
| Normal butylenes | 34.6 |
| Isobutane | 12.3 |
| Normal butane | 51.5 |

*Residual pentane-amylene*

| | |
|---|---|
| Tertiary amylenes | 5.0 |
| Normal amylenes | 29.4 |
| Isopentane | 23.6 |
| Normal pentanes | 42.0 |

On reacting the absorption products with the residual olefin-containing hydrocarbon from the other absorption step of the process, the following results are obtained under the reaction conditions given below:

| | Reaction of absorbed isobutylene with residual pentane-amylenes | Reaction of absorbed tertiary amylenes with residual butane-butylenes |
|---|---|---|
| Mols of Unabsorbed Olefin per mol of absorbed Olefin | 5/1 | 3/1 |
| Mol ratio $H_2SO_4$ to total Olefins | 0.5/1 | 0.75/1 |
| $H_2SO_4$ concentration (hydrocarbon free basis) | 70 | 70 |
| Acid/HC. phase ratio | 1/1 | 1/1 |
| Temperature, °C | 80 | 90 |
| Average contact time | 10 | 15 |
| Per Cent Absorbed Tertiary Olefin Reacted | 100 | 90 |
| Mol Ratio of n-olefin to Tertiary Olefin Reacted | 0.50/1 | 0.65/1 |
| Composition of polymer: | | |
| Per Cent Octylenes | 29 | 4 |
| Per Cent Nonylenes | 56 | 61 |
| Per Cent Decylenes | 5 | 24 |
| Per Cent higher boiling | 10 | 11 |
| Composition of unreacted hydrocarbons: | | |
| Butylenes | 2 | Isobutylene____ 0 |
| Tertiary amylenes | 2 | Normal butylenes. 26 |
| Normal amylenes | 17.5 | Isobutane____ 13.5 |
| Isopentane | 28 | Normal butane 57.5 |
| Normal pentane | 50.5 | Amylenes____ 3 |

On hydrogenation of the different polymer fractions using a nickel catalyst at 150° C. and a liquid hourly space velocity of 2, paraffins having the following properties when tested in a one cylinder test engine as a 30% blend in a fuel containing 83% S and 17% M and having an F-3 rating equal to iso-octane +0.26 cc. TEL when containing 4.0 cc. TEL per gallon were obtained:

*CRC F-4-443 (rich mixture anti-knock quality), index number*

|  | Hydrogenated Products of Reaction of Isobutylene with Residual Pentane-Amylenes | Hydrogenated Products of Reaction of Tertiary Amylenes With Residual Butane-Butylenes |
|---|---|---|
| $C_8$ fraction | 140 | 120 |
| Isononanes | 160 | 160 |
| $C_{10}$ fraction | 110 | 190 |

By feeding the residual unreacted olefins together with the $C_8$ and $C_{10}$ fractions of the polymer to an isobutane alkylation carried out in the presence of 90%–98% $H_2SO_4$ at 20° C. and using a feed ratio of isobutane to total olefin of 7:1 and an internal hydrocarbon recycle ratio of 20:1, the yield of aviation boiling products is 136% including an isononane yield of 39.5% based on the original olefin fed. Furthermore, due to the pretreatment of the alkylation feed stock the alkylation catalyst life is exceptionally long being of the order of 20–30 volumes of alkylate per volume of acid. This increase in acid life is achieved without any loss of valuable olefins and the product made up of 30% isononanes, and 70% light alkylate has an octane number and a performance index number of 94 and 146, respectively.

It will be seen that the invention offers many advantages over prior methods of operation, particularly with respect to the yield of high quality motor fuel which it makes possible and the economy of operation achieved. It will be understood that the invention is not restricted to the details of operation disclosed since many variations may be made in the procedure described. Thus, while reaction of absorbed tertiary olefins with unabsorbed residual olefin from the other separated fraction has been described as the preferred procedure, it is possible to carry out the process in the reverse manner, as by reacting an absorption product of normal butylenes in surfuric acid, for example, with tertiary amylenes in an unabsorbed state and reacting an absorption product of the normal amylenes from which said tertiary amylenes were separated with isobutylene whether absorbed or not. The residual butylenes in line 40 of the drawing may be contacted with sulfuric acid to absorb secondary butylenes therefrom and the absorption product may be used in reactor 44 instead of the previously described mixture of butylenes and butane. The same modification may be used in the normal amylene reaction of the process. Alternatively, the tertiary olefins may be separated by close fractionation or extractive or azeotropic distillation or absorption in a solvent and regeneration therefrom or other suitable manner and the reactions then carried out with the reactants in the liquid or vapor phase using a solid polymerization catalyst such, for example, as phosphoric acid deposited on a siliceous support or other suitable contact catalyst. Still other variations in the process may be made without departing from the principles of the invention which is not limited to the details disclosed by way of illustration nor by any theory proposed in explanation of the improved results achieved.

I claim as my invention:

1. In a process for producing high yields of hydrocarbons of high power output from hydrocarbon cracking products by fractionating said cracking products to separate a fraction consisting of butanes, isobutylene and normal butylenes and another fraction consisting of pentanes, tertiary amylenes and normal amylenes, wherein isobutylene is selectively extracted from said butane-butylene fraction with aqueous sulfuric acid and tertiary amylene is selectively extracted from the pentane-amylene fraction, isononylenes are produced by separately reacting the isbutylene-containing extract with the residual hydrocarbon from said tertiary amylene extraction to effect interpolymerization of absorbed isobutylene with n-amylenes and reacting the tertiary amylene-containing extract with residual hydrocarbon from said isobutylene extraction to effect interpolymerization of absorbed tertiary amylene with normal butylene, the hydrocarbon products of said interpolymerizations are separated from the acid present during said interpolymerizations, and the nonylenes produced are hydrogenated, the improvement which comprises feeding the acid separated from the hydrocarbon products of said isobutylene-n-amylenes interpolymerization to said tertiary amylene absorption and feeding the acid separated from the hydrocarbon products of said tertiary amylene-normal butylene interpolymerization to said isobutylene absorption.

2. In a process for producing nonylenes from a hydrocarbon fraction containing isobutylene and normal butylenes and another fraction containing tertiary amylenes and normal amylenes wherein isobutylene is selectively extracted from said isobutylene-containing fraction with a polymerization catalyst in the liquid phase under non-polymerizing conditions, tertiary amylene is separately extracted selectively from said other fraction with a polymerization catalyst in the liquid phase under non-polymerizing conditions, the extract of isobutylene in said liquid polymerization catalyst is reacted under polymerization conditions with the residual normal amylene-containing hydrocarbon from said tertiary amylene extraction to produce nonylenes, the extract of tertiary amylene in said liquid polymerization catalyst is separately reacted under polymerization conditions with residual normal butylene-containing hydrocarbon from said isobutylene extraction to produce nonylenes, and the polymerized mixtures are each separated into a polymer-containing hydrocarbon phase and a liquid polymerization catalyst phase, the improvement which comprises feeding the polymerization catalyst separated from the hydrocarbon products of said isobutylene-normal amylene interpolymerization to said tertiary amylene absorption and feeding the polymerization catalyst separated from the hydrocarbon products of said tertiary amylene-normal butylene interpolymerization to said isobutylene absorption.

SUMNER H. McALLISTER.

(References on following page)

REFERENCES CITED

The following references are of record in the file of this patent:

UNITED STATES PATENTS

| Number | Name | Date |
|---|---|---|
| 1,844,211 | Davis | Feb. 9, 1943 |
| 2,007,160 | Engs | July 9, 1935 |
| 2,138,881 | Pyzel | Dec. 6, 1938 |
| 2,174,247 | McAllister | Sept. 26, 1939 |
| 2,211,747 | Goldsby | Aug. 13, 1940 |
| 2,232,674 | Pyzel | Feb. 18, 1941 |
| 2,271,092 | Perkins | Jan. 27, 1942 |
| 2,300,817 | Sweeney et al. | Nov. 3, 1942 |
| 2,342,074 | Deanesly | Feb. 15, 1944 |
| 2,353,490 | Noorduyn | July 11, 1944 |

FOREIGN PATENTS

| Number | Country | Date |
|---|---|---|
| 530,250 | Great Britain | Dec. 9, 1940 |